UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

COMPOUND OF PYROXYLIN.

SPECIFICATION forming part of Letters Patent No. 559,824, dated May 12, 1896.

Original application filed August 28, 1893, Serial No. 484,234. Divided and this application filed June 22, 1895. Serial No. 553,692. (No specimens.)

*To all whom it may concern:*

Be it known that I, JOHN H. STEVENS, of the city of Newark, county of Essex, and State of New Jersey, have invented certain new and useful Improvements in Compounds of Pyroxylin, of which the following is a specification.

Compounds of pyroxylin, as is well known, are composed of pyroxylin combined with suitable solvents. The solvents are of two kinds—liquid and solid. Ether alcohol and wood-spirit are good examples of the liquid solvents, and ordinary gum-camphor is a solid solvent.

The present invention relates solely to liquid solvents, and is a division of my original specification, filed August 28, 1893, Serial No. 484,234.

For a description of the state of the art and the nature of the solvents of pyroxylin I refer to the United States Patent No. 517,987, granted to me, and dated April 10, 1894.

As a rule the solvents heretofore known have been composed of simple substances or mixtures of the same. It is the object of the present invention to furnish a series of compound solvents, by the use of which a great many of the important effects desired in pyroxylin mixtures can be cheaply and effectually secured.

Although the use of mixtures of solvents has been productive of effects which were an improvement over the use of simple substances it has been attended with more or less difficulty, due especially to the different volatilities or lack of harmony or chemical union between the various ingredients of the mixed solvent. Hence, in evaporating a thin solution, for instance, to form a film, the action has not been continuous and uniform, but the film has shown considerable variation of homogeneity or surface appearance largely due to these causes.

In carrying out my present invention I prepare a series of solvents by subjecting various mixtures of alcohols to the action of a mixture of benzoic and sulfuric acids, or to any appropriate reaction which will produce benzoic esters when an alcohol is combined with benzoic acid. By this means I make solvents of new composition or a series of complex esters or ethers, which not only differ from the solvents heretofore known, but are distinct from a mixture made up of alcohols separately transformed into their respective benzoates. In my United States Patent No. 269,340 I have disclosed the usefulness of benzoic ether.

By the present invention I am enabled to secure not only the advantageous action of the benzoic ether, but when the ethyl and amyl alcohols are associated together, or with other alcohols during the process of transformation into esters or ethers, I find that the reaction is extremely complex, producing a series of compound ethers or esters by the reaction between the alcohols and the acids. I find also that while a mixture of alcohols may be such that the final purified distillates contain liquids of different volatilities the evaporation of my new solvents from pyroxylin compounds is more regular and uniform and removes several of the difficulties connected with the use of simple mixtures of solvents heretofore referred to.

When I wish a highly-volatile solvent, I subject a mixture of the more volatile alcohols—such as methyl, ethyl, and propyl alcohols—to the action of a mixture of sulfuric and benzoic acids. On the other hand, when I desire a solvent of low volatility or one which will permit a compound made with it to dry out slowly, I act on a mixture in which the heavier alcohols preponderate.

In manufacturing the present series of solvents I have found that the following formula will produce an excellent solvent of average volatility, which is useful in dissolving pyroxylin, either to a thin or syrupy consistency for use as a varnish or spreading solution, for which a large excess of the solvent is required, or it can be employed in small enough proportions to produce pasty masses or compounds in which the solvent action is assisted by mastication under heat in the manufacture of what is known as the more solid varieties of pyroxylin compounds. In all these cases, while the heavy benzoic esters remain to some extent a part of the dried film or massive compound, I prefer to employ camphor where plasticity under heat is desired, for I find that the use of camphor is not incompatible with the employment of the present series of solvents, and it is a well-known agent for securing plasticity in the final product. Wood-spirits, four parts, by weight; ethyl alcohol, four parts, by weight; crude fusel-oil, four parts, by weight; potassium benzoate, nine parts, by weight; sulfuric acid, six parts, by weight. These substances are mixed together, heated about thirty minutes to 100° centigrade, and water added to separate the solvent. The latter is then dehydrated and rectified.

As before stated, any equivalent method which is known to produce benzoic ethers or esters can be substituted.

By increasing the proportion of alcohols to the acids I get a lighter etherifying effect, which, in proportion as the reaction decreases in intensity or amount, produces weak solvents, (when they are to be used alone;) but even the weak solvents can be usefully employed as diluents or menstrua for use in connection with more active solvents. This is especially true of the products of the higher or heavier alcohols, although I have found that it is not practicable to employ alcohols which are higher than those found in reasonable quantities in fusel-oil. These diluents are also useful in connection with camphor and its equivalents in forming the solid compounds.

It is difficult to ascertain chemically why the mixed benzoic esters produced by the present method are superior to the mixture of separately-made substances. The chemical reaction is principally as follows:

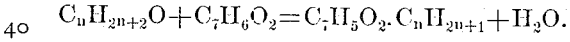

$$C_nH_{2n+2}O + C_7H_6O_2 = C_7H_5O_2 \cdot C_nH_{2n+1} + H_2O.$$

In the above equation $C_nH_{2n+2}O$ represents the chemical formula of the homologous monohydric aliphatic alcohols, and the term $C_nH_{2n+1}$ represents the radicles of such alcohols when combined with the radicle of benzoic acid $C_7H_5O_2$.

The fact that the solvent produced by acting on a mixture of alcohols and benzoic acid with sulfuric acid or other equivalent reagent (gaseous hydrochloric acid, for instance) is superior to a mere mechanical mixture of the benzoic esters may be due to the presence of unaltered alcohols and of condensation products of such alcohols in such mixtures.

The use of the entire series of solvents which form the basis for the present invention is not incompatible with the employment therewith of other solvents, such as acetone, wood-spirit, acetate of amyl, &c., although the operator will find that the solvents of this application are capable of a wide range of usefulness, and practically all of the effects obtainable by the employment of the well-known liquid solvents can be produced with them.

In using the compound solvents produced by the present method a knowledge of the art possessed by the skilled operator is all that is required to enable him to apply them to the various products which it is desired to manufacture.

The nature of the solvent is also to be taken into consideration in making these various products, for in evaporating the solvent from the compound (which is always done in practical applications) certain undesirable residues are apt to be left in the product, unless care be taken to take proper solvents for the solution.

While I produce certain new combinations not heretofore known as pyroxylin solvents it is true, nevertheless, that some of the substances resulting from the reactions I have described exist in the final compound solvent as separable bodies exerting their individual solvent powers in the well-known manner. For instance, in acting upon a mixture of the alcohols, as hereinbefore described, the result of the reaction is a production to some extent of the benzoic ether described by me as a solvent in United States Patent No. 269,340 of December 19, 1882. I recognize, therefore, that in my present compound solvents, wherever the benzoic ether occurs, I am using it according to my former invention of December 19, 1882, just referred to. Again, when I am acting on any of the mixtures of alcohols found in the different varieties of fusel-oil to form the present series of solvents, some of the unaltered fusel-oils may exist as such in the resulting compound solvent. The use of such unaltered fusel-oil in connection with camphor I recognize as an employment of my Patent No. 269,343 of December 19, 1882.

I do not herein claim the manufacture or use of any of the benzoic ethers or esters separately, and I recognize the state of the art as disclosed in other patents and other publications.

What I do claim, and desire to secure by Letters Patent, is—

1. The method of producing pyroxylin compounds which consists in combining pyroxylin with a solvent resulting from acting on a mixture of alcohols with benzoic acid, substantially as described.

2. As a new composition of matter, a pyroxylin compound containing pyroxylin, and one or more solvents obtained by acting on a mixture of alcohols with benzoic acid, substantially as described.

3. As a new composition of matter, a pyroxylin compound containing pyroxylin, one or more known solvents of pyroxylin and one or more solvents obtained by acting on a mixture of alcohols with benzoic acid, substantially as described.

In witness whereof I have hereunto signed my name this 20th day of June, 1895.

JOHN H. STEVENS.

In presence of—
ABRAHAM MANNERS,
F. WM. RAWLE.